US007049391B2

(12) United States Patent
Gähr et al.

(10) Patent No.: US 7,049,391 B2
(45) Date of Patent: May 23, 2006

(54) METHOD FOR REDUCING THE CAPROLACTAM CONTENT OF POLYAMIDE 6, A POLYAMIDE 6 AND USE THEREOF

(75) Inventors: Frank Gähr, Esslingen (DE); Frank Hermanutz, Leonberg (DE); Mirko Peczyoski, Sehliersee (DE)

(73) Assignee: BASF Aktiengeselleschaft, Ludwigshafen (DE)

( * ) Notice: Subject to any disclaimer, the term of this patent is extended or adjusted under 35 U.S.C. 154(b) by 29 days.

(21) Appl. No.: 10/381,453

(22) PCT Filed: Sep. 24, 2001

(86) PCT No.: PCT/EP01/11025

§ 371 (c)(1),
(2), (4) Date: Aug. 8, 2003

(87) PCT Pub. No.: WO02/26865

PCT Pub. Date: Apr. 4, 2002

(65) Prior Publication Data

US 2004/0049005 A1    Mar. 11, 2004

(30) Foreign Application Priority Data

Sep. 26, 2000 (DE) ................. 100 47 657

(51) Int. Cl.
*C08G 69/08* (2006.01)
*C08G 69/26* (2006.01)
*C08G 6/00* (2006.01)

(52) U.S. Cl. .............. 528/310; 528/312; 528/314; 528/323; 528/480; 528/486; 528/499; 264/176.1; 264/211.21; 264/211.22; 428/357; 428/364; 428/395

(58) Field of Classification Search ............. 528/323, 528/310, 312, 314, 499, 480, 486; 264/176.1, 264/211.21, 211.22; 428/357, 364, 395
See application file for complete search history.

(56) References Cited

U.S. PATENT DOCUMENTS

| 3,239,490 A | | 3/1966 | Gee et al. |
| 3,329,653 A | * | 7/1967 | Beavers et al. ............. 528/176 |
| 3,578,640 A | | 5/1971 | Twilley et al. |
| 3,879,354 A | | 4/1975 | Bonner |
| 4,327,208 A | * | 4/1982 | Lehr et al. ................... 528/323 |
| 4,574,054 A | * | 3/1986 | Ciaperoni et al. ..... 252/183.11 |
| 5,169,582 A | | 12/1992 | Illing |
| 5,703,204 A | * | 12/1997 | Gittinger et al. ............ 528/486 |
| 5,834,089 A | * | 11/1998 | Jones et al. ................... 428/97 |
| 6,359,020 B1 | * | 3/2002 | Mohrschladt .............. 521/49.8 |
| 6,476,181 B1 | * | 11/2002 | Alsop et al. ................. 528/323 |
| 6,525,167 B1 | * | 2/2003 | Mohrschladt et al. ....... 528/310 |
| 6,710,159 B1 | * | 3/2004 | Morhenn et al. ........... 528/310 |

FOREIGN PATENT DOCUMENTS

FR    1.574.077    6/1969

* cited by examiner

*Primary Examiner*—P. Hampton Hightower
(74) *Attorney, Agent, or Firm*—Birch, Stewart, Kolasch & Birch, LLP

(57) ABSTRACT

The invention relates to a method for reducing the caprolactam content of polyamide 6 obtained especially by hydrolytic polymerization of epsilon-caprolactam. The method is characterized by the use of an additive that forms isocyanuric acid under the influence of heat. The additive or the isocyanuric acid produced externally under the influence of heat is added (a) to the polymerization or (b) to a melt of polyamide 6. This enables the caprolactam content of the polyamide 6 to be reduced considerably compared to that of usual commercial polyamide 6. In particular, the resulting polyamide 6 shows good characteristics for reprocessing e.g. into fiber and molding masses by melt extension.

32 Claims, 1 Drawing Sheet

Figure 1:
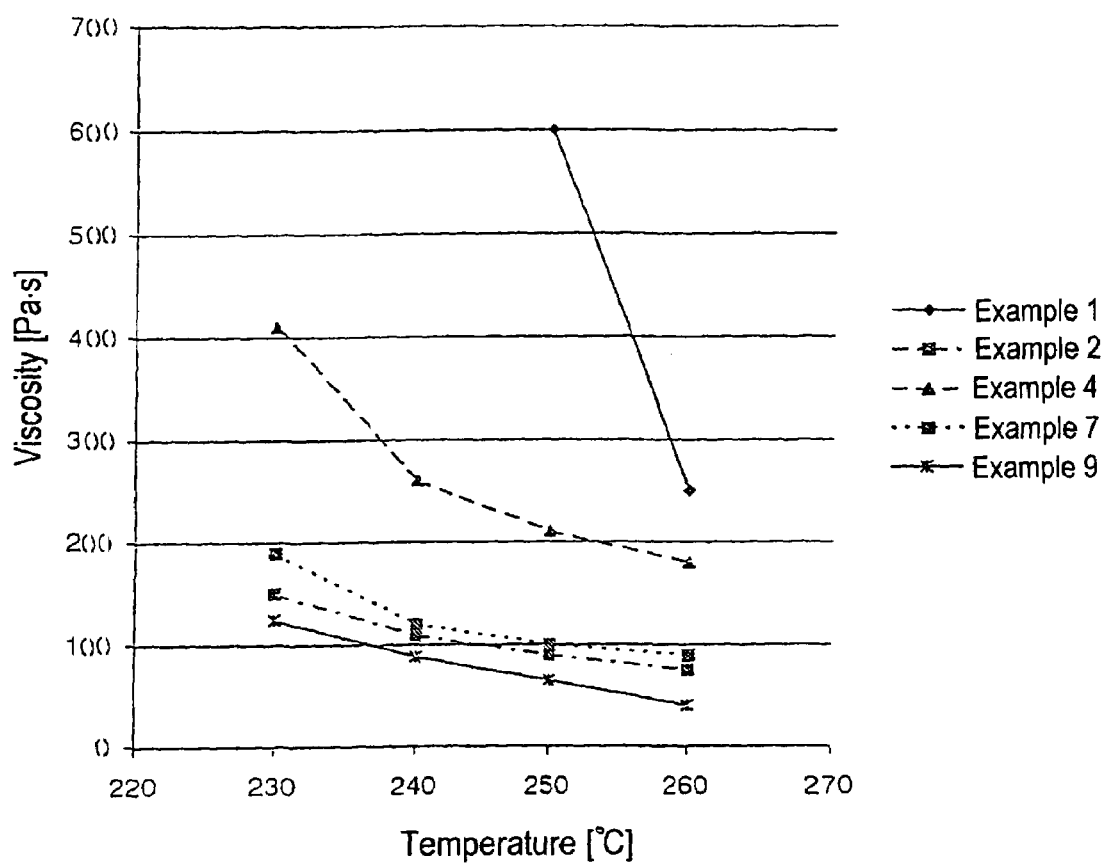

METHOD FOR REDUCING THE CAPROLACTAM CONTENT OF POLYAMIDE 6, A POLYAMIDE 6 AND USE THEREOF

The invention relates to a method for reducing the caprolactam content of polyamide 6, obtained especially by hydrolytic polymerization of epsilon-caprolactam, a polyamide 6 prepared accordingly and use thereof.

For large-scale production of polyamide 6, epsilon-caprolactam in polymerized in the melt under addition of water or substances giving off water. The first step is hydrolysis of a part of the caprolactam to release acid. Said initiation can be accelerated by addition of 6.6 salt (hexamethylene-di-ammonium-adipate), alpha-omega-amino carbonic acids, acid/alcohol mixtures or other compounds. The free amino acid can then add caprolactam or polycondense while splitting off water. Accordingly, three principal reactions are observed: ring opening of the lactam by means of water, polyaddition of the lactam at the developed free acid and polycondensation of the amino carbonic acid. In addition, re-amidations take place which accelerate the adjustment of the distribution balance. The reaction responsible for the reaction of lactam is the polyaddition of the lactam to the amino groups of the growing polymer chain. Said reaction occurs quicker by orders of magnitude than the polycondensation reaction itself. The lactam reaction in polymerization is dominated by the lactam addition to end groups; the incorporation of lactam in linear amide groups is of little significance. The polyaddition takes place at the amino groups, while the carboxyl end groups are reaction carriers and react only at low reaction speed via condensation with amino groups. High concentration of amine- and carboxyl groups increase the speed with which the polyaddition balance is reached. With progressive reaction time, an equilibrium-polymerizate is attained which contains in dependence upon temperature, initiator amount and water content, 7 to 12 percent by weight of monomeric caprolactam. According to Reimschuessel (J. Polym. Sci. Macromol. Rev. 12 (1977), 65) the equilibrium concentration of caprolactam amounts to 7.8% at 250° C., that of the cyclic dimer 1.13%, of the trimer 0.8% and the tetrameric 0.6%. The equilibrium concentration of caprolactam tendentially declines with temperature and water content. At 250° C. and 1 mol water/mol caprolactam, the equilibrium polymerization degree amounts to $P_n$=300. At 6 mol water/mol caprolactam, $P_n$ reduces to 100. Prior to further processing, the monomeric lactam is removed, except for a residual content of usually approximately 0.5–1.1 weight %, either by extraction (washing of the granulate with water) or via vacuum. A significant part of the equilibrium water is likewise removed. A thusly pre-treated product, which was brought out of its state of equilibrium, returns, however, to equilibrium during melting, i.e. the monomer content will increase.

Smith (J, Polym. Sci. 30 (1958), 459) and Hermans (J. Polym. Sci 16 (1955), 451) were working on re-establishment of equilibrium and velocity of lactam re-formation in lactam-free polyamide 6. According to their results, the product of the concentration of amino- and carboxyl end groups is directly proportionate to the lactam re-formation velocity. Consequently the re-formation of the caprolactam preferably occurs via the polymer chain end by monomer split-off. For attaining a low re-formation velocity, the number of the free ends should be as low as possible. Klare (Synthetic Fibers of Polyamide, Akademie Publishing House, Berlin 1063) describes the influence of temperature on the caprolactam re-formation. Accordingly, at customary processing temperatures from 280° to 290° C., more than 2% of low-molecular parts are formed within a few minutes. In the temperature range from 230° to 240° the polyamide 6 melts are significantly more stable. In this instance, within 10 minutes very few monomers are re-formed and over a period of 30 minutes approximately 0.5% of monomers are re-formed.

Compared with other polymers, the very high monomer contents in polyamide 6 causes, despite described extraction methods, significant problems in re-processing steps. Commercial polyamide yams contain 0.5 to 1% by weight of monomeric epsilon-caprolactam. In raw product fixing of polyamide fabrics, which is done at 180 to 200° C., up to 50% of caprolactam are emitted due to the high pressure of steam. Caprolactam contents in the exhausted air of 2 to 6 g per kilogram are thus no rarity in textile plants processing polyamide 6 goods. The applicable emission limit values in the exhaust air are exceeded by approximately ten-fold. The producers of polyamide 6 therefore are faced with the problem of producing polyamide 6 types with reduced caprolactam release, especially since caprolactam was classified 1997, due to its noxious properties, in Category 1 of the MAK listing.

It has been demonstrated that by means of purely technological optimization of existing methods and processing steps, it will not be possible to attain the required reduction in caprolactam content by a factor of 10 in order to stay within the limit values. The reduction potential in this regard is estimated by the producers of polyamide 6 as only 10 to 20%. In order to achieve significant reduction of caprolactam content in polyamide 6, there remains, as an alternative, only targeted addition of certain additives, i.e. a chemical modification of the polyamide. Practice-relevant Polyamide 6 modifications in the textile sector are performed primarily with respect to viscosity stabilization and coloring capability. Ordinarily, polyamides are dyed with acid coloring substances in low-acid medium, whereby the free amino end groups are present in form of ammonium groups. Sulfogroups containing coloring substances,—present in anionic form in the coloring medium,—to be named in this connection are primarily acidic coloring substances— these are linked to the polyamide fiber via ionic reciprocal action. The more amino end groups a polyamide fiber material contains, the more anionic dye can be bonded up to the point of adsorptive saturation limit (Langmuir Isotherm).

Only few works are known in the pertinent technical literature which dedicate themselves to the object of performing polyamide modifications aimed at reduced monomer content. DE-C-1 130 592 describes that with water-less polyamide 6 synthesis, which is catalyzed by acid hydrogen chloride amino salts, it is possible to obtain very low lactam re-formation. This is traced to the lack of carboxyl groups. This polymerization method was developed in order to produce polyamides with stable molecular size. Industrially it was not actualized. U.S. Pat. No. 4,574,054 describes a polymerization method in which he caprolactam content of the polymer and the fibers is significantly reduced. This was obtained by application of a certain system of molecular weight regulation and by use of a somewhat complicated polymerization process. It is also known that it is possible to obtain polyamide 6 with lower caprolactam content by raising the medium molecular weight of the polyamide 6, for example by means of subsequent condensation. Said measure, however, is very expensive and it is, furthermore, accompanied by a distinct increase in the relative melt- and solution viscosity.

It is the object of the present invention to produce polyamide 6 types for fibers, molding materials etc. whose caprolactam contents lies substantially below those of the polyamide 6 currently being available on the market. In so doing it is necessary to not only drastically reduce the caprolactam contents at the end of the polymerization, but also the caprolactam re-formation which can be observed at high temperatures during thermoplastic processing in the melt. The new polyamide 6 types must be able to be produced without significant change via current polymerization techniques, in particular, the additives to be charged must be cost-effective, so that from a pricing point of view, the products are comparable to the price of the traditional polyamide 6 types.

The solution viscosities of the new polyamide 6 types shall be comparable with those of standardly produced polyamide 6, whereby the step of subsequent condensation shall especially be eliminated. In accordance with another object, the method shall also facilitate production of polyamide 6 types which do not cause any problems in behavior during further processing and in particular with respect to coloration properties.

Said object is solved according to the invention in that an additive is employed which forms isocyanic acid under the influence of heat, whereby the additive is added or isocyanic acid formed externally from the additive under the influence of heat is added for a) polymerization or b) to a melt of polyamide 6.

Based on the invention, polyamide 6 type can be produced and/or polyamide 6 be treated whereby current production methods and/or raw materials are employed in order to achieve the inventive objective. With respect to measure a) the additive and/or the externally formed isocyanic acid is added to the polymerization whereby the polyamide 6 is specifically obtained by hydrolytic polymerization of epsilon-caprolactam. With respect to measure b) a commercial grade polyamide 6 is melted, which may be in the form of cuttings, chips or granulate. The term "commercial grade" includes an executed extraction measure, for example in form of an extraction with water or in form of low pressure; the commercial grade polyamide 6 which is employed under measure b) consequently presents epsilon-caprolactam contents customarily adhering to said commercial grade polyamide 6 products of approximately 0.5 to 1.1 percent by weight. Said polyamide 6 is melted and the additive and/or the externally formed isocyanic acid is added to the melt.

A particular identifying property of the additive is that it forms isocyanic acid under effect of heat when realizing the invention. The isocyanic acid forms during the course of polymerization or within the melt by thermal decomposition of, in particular, urea, condensation products of urea, specifically biuret, triuret and cyanuric acid, as well as other urea derivatives and/or oligomeric or polymeric urea compounds which release isocyanuric acid under the effect of thermal energy. Mention might be made of the following, for example: silylcarbamat, trimethyl-silylcarbamat, trimethyl-silyl-urea, poly-(nonamethylen)-urea.

It is also possible to form the isocyanic acid externally from the specified raw materials by thermal decomposition. The decomposition can also be initiated by energy input via electro-magnetic radiation. Said externally formed isocyanic acid is added then to the polymerization or to the melt of polyamide 6.

During the polymerization of epsilon-caprolactam in the broadest sense, especially during the occurring equilibrium phase, additives are then added, which form isocyanic acid under the influence of heat. Said acid readily reacts with substances which contain hydroxyl groups, carboxyl groups or amino groups. In the case of alcohols, carbamates are formed, with carbonic acids, derivatives of carbonic acid amides and with amines, derivatives of urea.

Urea decomposes above its melting point of 132.7° C. into isocyanic acid and ammonia. In contrast thereto, with decomposition of cyanuric acid, which may be considered as cyclical trimer of the isocyanic acid, there occurs, under appropriate conditions, almost exclusively, isocyanic acid. It is true that the decomposition temperature of cyanuric acid is very high at over 300° C. In technical science, reactions of isocyanic acid primarily play a role in the production of cellulose-carbamat or of poly-urea. Production of the poly-urea 6D1 takes place, for example, by means of polymerization of hexamethylene-diamine and urea. Basic details and problems of polymerization are described in GB 981,813 and also in U.S. Pat. No. 3,329,653. It is thus assumed that the reaction as outlined above takes place via thermal decomposition of urea and the developing isocyanic acid reacts with the amino radicals of the diamine component. From the diamine component are thus formed urea radicals, which pyrolyze to isocyanates, which, in turn, can be re-combined with amino-radicals. The developing addition compound reacts further, so that always longer chains are formed during the addition reaction. As drawback is stated that with the high temperatures of the poly-urea synthesis, the intermediately occurring isocyanic acid or developing isocyanates do not exclusively react with the primary amino groups at the chain end of the addition polymer, but likewise with chain amide groups. As a result, cross-linkages are obtained which will result in a no longer thermoplastic product, so that it is no longer possible to melt the poly-urea in un-decomposed condition. In the cited patent specification there is, however, no reference that the reaction between urea (as well as the there cited urea derivative) and corresponding di-primary diamines can similarly also be executed with lactames. Furthermore, the inventions claimed in the two patents are not aimed at polyamide types of the AB-type, as described in the present invention, but at the production of poly-ureas.

It has now been determined,—surprisingly—that isocyanic acid which can be generated intermediately from urea or other aforementioned urea derivatives, is also suitable for modification of polyamides of the AB type. To that end, prior, during or subsequent to the polyaddition, small amounts of additive are added, such as in particular urea or biuret. Since chain split-off in the polyamide 6 takes place primarily via the chain ends, it is of benefit to only add the appropriate additives releasing the isocyanic acid or the externally formed isocyanic acid toward the end of the polymerization, during the so-called equilibrium phase, so that sound and unimpeded polymer construction occurs by means of ring-opening polymerization of the caprolactam, in order to largely preserve the bulk properties of polyamide 6. The isocyanic acid, forming under the customary polymerization temperature, forming especially from urea, reacts primarily with the end groups of the polymer chains. A modified polyamide 6 produced in this fashion presents firstly less monomeric content and secondly, to the extent that caprolactam was extracted by water from polyamide produced in such manner, during repeated melting, caprolactam is re-formulated more slowly. Another benefit are lower melt viscosities of the modified polyamide 6 types. Extrusion of the melt can thus be executed at lower temperature than with the unmodified polyamide 6. Based on the lower temperature, with equal dwelling time, for example, in an extruder, the velocity of the caprolactam re-formulation in the melt declines significantly.

The amount to be added of one or several of the named additives and/or externally formed isocyanic acid can be kept low in comparison with the amount of the employed monomeric epsilon caprolactam, specifically at approximately 0.01 to 10 percent by weight, whereby approximately 0.1 to 3 percent of weight is especially preferred. This presents the advantage that inter-lacings between polymer chains will not take place or are so infrequent that the processing behavior of the inventively produced polyamide 6 types is not noticeably affected. This does not exclude, however, that, compared with the lactame share, also copolymers with higher share of urea, for example, can be produced. Production of polyamides modified in such manner can be performed by intermittent as well as continuous procedure according to customary polymerization techniques. According to the invention, the isocyanic acid can be added prior to, during or after the polymerization proper of the epsilon caprolactam. For continuous operation in a VK tube, for example, addition in the pressure zone is of benefit.

It is, however, also possible to melt an unmodifed, commercial-grade polyamide 6, which is present, for example, in the form of cuttings, chips or granulate, and add to said melt the isocyanic acid forming additive and/or the externally formed isocyanic acid. This is beneficially done in a heatable mixer, which is beneficially equipped with a gas removal zone. It is particularly preferred if an extruder is used as mixer, especially a two screw extruder. The temperature in the mixer and/or means b) is preferably set at approximately 210° C. to 300° C., in particular at approximately 230° C. to 260° C. This means that similar thermal conditions exist as with the further processing of a polyamide 6 obtained according to a) for making shaped articles and fibers by melt extrusion. The amounts which are added as additive according to b) correspond to the values stated relative to step a).

The above explained procedure a) is preferably controlled in such manner that the contents of epsilon caprolactam in the obtained polyamide 6 is adjusted to less than approximately 7 percent by weight, especially less than approximately 4% by weight. Preferably the content of epsilon caprolactam of the polyamide attained according to the invention is further reduced by traditional extraction methods to an extent which is justifiable from an economic point of view. The extraction can be done especially by treating the polyamide 6 produced according to procedure a) in accordance with the invention, with hot water or by withdrawal of the epsilon caprolactam by means of low pressure. It is a special benefit of the polyamide 6 produced according to procedure a) that same, following the above stated extraction methods, clearly contains less epsilon caprolactam than a standard polyamide 6. Therefore, there is no difficulty in producing polyamide 6 obtained according to procedure a), taking into account the economic feasibility of the method, with an epsilon caprolactam content of less that approximately 0.5 percent by weight, in particular less than approximately 0.3 percent by weight relative to polyamide 6.

Preferred variations of procedure a) are obvious from the examples 2 to 6 which follow, in order to obtain very low contents of epsilon caprolactam in polyamide 6. It is of particular benefit that a polyamide 6 produced according to procedure a) of the invention, can be extracted to very low residual contents of epsilon caprolactam, so as to fall below the legally mandated low emission values during later processing. Until now, this was not possible with the traditional commercial grade polyamide 6 types, or only possible subject to immense technical expense. The essential goal of the invention is thus achieved, i.e. the reduction of the epsilon caprolactam content in polyamide when producing and processing same.

The inventively obtained polyamide 6 types can be further processed in particularly beneficial manner by melt extrusion into all kinds of products, in particular molding materials and fibers. A temperature of preferably approximately 210 to 300° C., in particular, of approximately 230 to 260° C. is hereby maintained. Proceeding according to a) can be utilized for adjustment of lower melt viscosity. This means that the extrusion of the melt can take place at a lower temperature than with commercial grade polyamide 6. According to a particularly preferred variation of the method, melt extrusion takes place at approximately 250° C. and below. This leads to the advantage that the re-formulation of the epsilon caprolactam—for which the rules apply described in the state of the art—takes place more slowly, so that the polyamide products produced according to procedure a) of the invention, present after extrusion, a lower content of epsilon caprolactam, provided there exists identical concentration of the extracted polyamide granulate prior to the extrusion.

The inventive method is beneficially implemented under addition additives, customary for the preparation of polycaprolactames, such as oxidation stabilizers, UV stabilizers, pigments and/or dyes.

It could not be expected that the coloration properties of the polyamide 6 types prepared according to the invention would differ only slightly from the commercial grade polyamide 6. Surprisingly, the polyamide 6 materials prepared according to the invention, show no direct correlation of the amino end group content with the color intensities obtained according to acid dying methods. In contrast to the commercial grade light- and/or deep-dye polyamide 6 types, the color intensities attained after dying with customary acid colors deviate only slightly in the inventively prepared polycaprolactames with respect to the color intensities obtained with unmodified polyamide 6 (see Table 1). In contrast thereto, greater deviations exist with the amino end group contents. This result is highly surprising, inasmuch as correlation of color intensity in the amino end groups belongs until now to the undisputed state of science relative to acid dying of polyamides.

By means of appropriate additions, as they are also customary with polyamide 6 (for example addition of special diamines and/or triamines) it is possible to clearly increase the color intensities of the polyamide 6 types prepared according to the invention. (see example 6).

With respect to the area of fibers, the inventively produced polyamide 6 types result in at least equally good mechanical properties as for a commercial grade standard tupe polyamide 6; this is particularly true with respect to fiber toughness. The inventive polyamide 6 types can be utilized for all application fields which also play a role for commercial grade polyamide 6. Included therein are mainly fibers for textile and technical applications, textiles and carpets manufactured from same, molding bodies and/or plastic parts, laminations, but also products from the field of adhesion technology (melt glue), films, lubricants, filters and adsorption agents.

The invention is explained in more detail in the examples below, whereby the chemical and physical values addressed in same are ascertained as follows:

Solution viscosity: Determination of relative solution viscosity $\eta_{rel}$ is performed according to ISO 307–1984 (E) at 25° C. in concentrated sulfuric acid (96% puriss., Riedel-de-Haen).

Melt viscosity:Determination of melt viscosity is done at a rheometric dynamic stress rheometer DSR 500 under nitrogen atmosphere. Measurements were taken at temperature between 230 and 260° C. with a cone-shaped plate arrangement in rotation.

Amino end groups: Determination of amino end groups was made potentiometrically with a titro-processor (Messrs. Metrohm). 1 kg phenol is mixed with 429 g of methanol p.a. and slightly warmed. To 50 ml of said solution is added 1 g of polymer granulate and under reverse flow warmed for 20 minutes until the solution reaches 90° C. The solution is titrated with a 0.1 N solution of perchloric acid in ethyleneglycol.

Carboxyl end groups: The carboxyl end groups were ascertained conductometrically. 1 g of polymer granulate is mixed with 50 ml of benzyl alcohol and under reverse flow heated for 30 minutes at 180° C. A constant stream of nitrogen is passed through. Upon complete solution of the polymer, titration is done with 0.1 N of benzyl-alcoholic soda lye.

Fiber Stability: The strength/expansion behavior of the fibers was tested on a Statimat M of the Textechno company according to DIN EN ISO 1421.

Coloring Tests: The filaments were stretched to a residual extension of 25% and knitted into a knitted hose. The knitted material was fixed for 20 seconds at 130° C. in a stretching frame and subsequently dyed in a tinting beaker with C.I. Acid Red 158 (Polymat, Messrs. Ahiba).

| Tinting Parameters: | |
|---|---|
| Color concentration: | 7.5% |
| Liquor ratio: | 140 |
| pH 4 Acetic Acid/ Sodium Acetate dying procedure: | starting with room temperature at 1.5° C./min to 60° C. and then another 100 minutes at 60° C. hot wash, cold rinse. |
| Color-metric determination of color intensity with Spectraflash 500 (Messrs. Datacolor)- based on the K/S value: | 590 nm |

EXAMPLE 1

COMPARISON EXAMPLE

Into a 5 liter autoclave with oil heating and stirring mechanism, 1400 gram epsilon caprolactam (12.38 mol) are added and in order to remove air oxygen, evacuated 5 times to 15 hPA, whereby each time ventilated with nitrogen. After that, the epsilon caprolactam is melted under nitrogen with continued stirring for 30 minutes at 80° C. Subsequent addition of 14.0 g, corresponding to 1% by weight of epsilon amino-capron acid, 42.0 ml, corresponding to 3% by weight of bi-distilled water and 4.2 g corresponding to 0.3 percent by weight of benzoic acid. The autoclave is fully sealed, heated for 2 hours to 230° C. and during another 2 hours to 245° C. At that temperature, polymerization is continued for another hour, whereby an excess pressure sets in of approximately 4500 hPa. The excess pressure is then carefully released and temperature increased to 260° C. after relaxation. During this procedure, nitrogen is constantly passed through the equipment. After 2.5 hours a turning moment of 2.7 Nm is reached. The reaction product is discharged by means of excess pressure via a 280° C. hot bottom valve into a gutter filled with ice water. The polymer strand is pulled off with a winding device and subsequently granulated. The granulate is then extracted in hot water at a liquor ratio of 1:100 for a period of 4 hours. From the watery extract, the caprolactam contents is determined by high performance liquid chromatography (HPLC) and calculated to the granulate mass. The result is a caprolactam content of 7.81% for this unmodified polyamide 6. The polyamide 6 granulate, having been extracted with hot water to a residual caprolactam content of <0.07%, by means of a Blaschke-Extruder, is melted and spun into threads at 260° C. (Average dwelling time in the extruder: 10 minutes). The threads are extracted in hot water with a liquor ratio of 1:100 and the caprolactam content in the watery extract is determined by HPLC and re-calculated to the polyamide 6 fiber material. With respect to the spun polyamide 6 threads, the result is an epsilon-caprolactam contents of 0.59 % by weight. Ability of being spun at 240° C. or 230° C. could not be tested due to the high melt viscosity (compare FIG. 1).

EXAMPLE 2

Similar steps are taken as in Example 1, but when reaching a turning moment of 2.7 Nm during the post-polymerization phase, 14 g urea (corresponding to 1% by weight) are added and stirring continued for 10 minutes at 260° C. After that, the obtained reaction product is discharged as in Example 1—it is granulated and the caprolactam content ascertained by means of HPLC. The polyamide 6 presents an epsilon-caprolactam content of 3.6% by weight. Further data with respect to relative solution viscosity, melt viscosity, amino- and carboxyl end groups and melting point, which were ascertained similarly as in Example 1, can be learned from Table 1. The product dissolves in the usual solvents for polyamide 6, such as for example hexafluor-isopropanol or trifluor-ethanol, in other words, it is not inter-laced. Moreover, it can be melted in non-decomposed state.

The polyamide 6 granulate, having been extracted with hot water to a residual caprolactam content of <0.07%, is melted via an extruder and spun into threads at 240 and 230° C. (Dwelling time 5 minutes). Ability of being spun at 260° C. could not be tested due to the low melt viscosity (compare FIG. 1). The caprolactam contents of the respectively obtained spinning threads, their ruggedness and color intensities (K/S value) were determined in similar fashion as in example 1 and can be learned from Table 1.

EXAMPLE 3

The procedure is similar as in Example 2, whereby, however, only 0.003 weight % of benzoic acid is added as chain regulator. When a turning moment of 6 Nm is attained during polymerization, 14 g urea (corresponding to 1% by weight) are added and stirring continued for another 60 minutes at 260° C. The procedure is continued as described in Example 1. The attained polyamide 6 has a caprolactam content of 1.20% by weight. Further data with respect to relative solution viscosity, melt viscosity, amino- and carboxyl end groups and melting point, which were ascertained similarly as in Example 1, can be learned from Table 1. The polyamide 6 granulate, having been extracted with hot water to a residual caprolactam content of <0.07% is melted by means of an extruder (dwelling time 5 minutes) and spun into threads at 260° C., 240° C. and 230° C. The caprolactam contents of the respectively obtained spinning threads, their ruggedness as well as color intensity (K/S value) are determined in similar fashion as in Example 1 and can be learned from Table 1.

EXAMPLE 4

Procedure is similar as in Example 3, whereby, however, addition of only 0.5% by weight of urea is made to the polymer melt upon attaining a turning moment of 6 Nm. The obtained polyamide 6 has a caprolactam content of 2.81% by weight. Further data with respect to relative solution viscosity, amino- and carboxyl end groups and melting point, which were determined in similar fashion as for Example 1, can be learned from Table 1. The polyamide 6 granulate, having been extracted with hot water to a residual caprolactam content of <0.07%, is melted by means of an extruder (dwelling time 5 minutes) and spun into threads at 260° C. and 240° C. The caprolactam contents of the respectively obtained spinning threads, their ruggedness and color intensity (K/S value) are ascertained in similar fashion as for Example 1 and can be learned from Table 1.

EXAMPLE 5

Procedure is similar as in Example 2, without, however, addition of benzoic acid as chain regulator. Also, 14 g urea (corresponding to 1% by weight) are already added at the beginning together in the amino capron acid. Subsequent thereto, polymerization is performed as described in Example 1. Only a relatively weak increase in the turning moment is observed. Processing of the polymerizate takes place similarly as in Example 1. The obtained polyamide 6 has a caprolactam content of 3.65% by weight. Further data with respect to relative solution viscosity, melt viscosity, amino- and carboxyl end groups and melting point, which were ascertained in similar fashion as in Example 1, can be learned from Table 1. The polyamide 6 granulate, having been extracted with hot water to a residual caprolactam contents of <0.07%, is melted by means of an extruder (dwelling time 5 minutes) and spun into threads at 260° C., 240° C. and 230° C. The caprolactam contents of the respectively obtained spinning threads, their ruggedness and color intensity (K/S value) are ascertained similarly as in Example 1 and can be learned from Table 1.

EXAMPLE 6

Procedure similar as in Example 4,—however, upon attaining a turning moment of 6.0 Nm, addition is made—aside from 7 g of urea (corresponding to 0.5% by weight)—of hexamethene-diamine (0.5% by weight). After that, stirring at 260° C. for 10 minutes. The obtained polyamide 6 has a caprolactam contents of 1.48% by weight. Further data with respect to relative solution viscosity, melt viscosity, amino- and carboxyl end groups and melting point, which were determined in similar fashion as in Example 1, can be learned from Table 1. The polyamide 6 granulate—having been extracted with hot water to a residual caprolactam content of <0.05%—is melted with an extruder (dwelling time 5 minutes) and spun into threads at a temperature of 260° C. The caprolactam contents of the respectively obtained spinning threads, their ruggedness and color intensity (K/S value) are determined similarly as in Example 1 and can be learned from Table 1.

EXAMPLE 7

Procedure similar as in Example 2, whereby, however, addition of 1% by weight of biuret is made to the polymer melt upon attaining a turning moment of 2.7 Nm. The obtained polyamide 6 has a caprolactam contents of 4.48% by weight. Further data with respect to the relative solution viscosity, melt viscosity, amino- and carboxyl end groups and melting point, which were determined in similar fashion as in Example 1, can be learned from Table 1. The polyamide 6 granulate—having been extracted with hot water to a residual caprolactam content of <0.1% is melted by means of an extruder (dwelling time 5 minutes) and spun into threads at 240° C. and 230° C. The caprolactam contents of the respectively obtained spinning threads, their ruggedness and their color intensity (K/S value) are determined in similar fashion as in Example 1, and can be learned from Table 1.

EXAMPLE 8

Procedure similar as in Example 4, whereby, however, 0.5% by weight of biuret is added to the polymer melt upon reaching a turning moment of 6 Nm. The obtained polyamide 6 has a caprolactam content of 1.34% by weight. Further data with respect to the relative solution viscosity, melt viscosity, amino- and carboxyl end groups and melting point, which were determined in similar fashion as in Example 1, can be learned from Table 1. The polyamide 6 granulate—having been extracted with hot water to a residual caprolactam content of <0.07% —is melted by means of an extruder (dwelling time 5 minutes) and spun into threads at 260° C. and 240° C. The caprolactam content of the respectively obtained spinning threads, their ruggedness and color intensity (K/S value) are ascertained in similar fashion as in Example 1 and can be learned from Table 1.

EXAMPLE 9

Procedure similar as in Example 2, whereby addition of exactly 1% by weight of cyanuric acid is made to the polymer melt upon attaining a turning moment of 2.7 Nm. The obtained caprolactam contents of the respectively obtained granulates and the spinning threads produced thereof, similarly as in example 1, but at 240° C. and 230° C., are listed in Table 1, the same as the number of end groups, the color intensities (K/S values) and the solution viscosity.

EXAMPLE 10 to 12

COMPARISON EXAMPLE

Procedure similar as in Example 2, whereby, however, addition is made, in Example 10, to the polymer melt, upon attaining a turning moment of 2.7 Nm, of exactly 1% by weight of sebacic acid—in Example 11, of exactly 1% by weight of hexamethylene-diamine and in Example 12, of exactly 1% by weight of sterically hindered amine. The obtained caprolactam contents for the respectively from polymerization obtained granulates and therefrom—similar as in Example 1—produced spinning threads—but at variable spinning temperatures—as well as the number of end groups, the color intensities (K/S values) and the solution viscosity are all listed in Table 1.

EXAMPLE 13

In a two-stage VK tube, consisting of pressure zone and relaxation zone, caprolactam is polymerized in the presence of 0.5% by weight of urea and 0.5% by weight of hexamethylene-diamine (in proportion to the caprolactam throughput) at a temperature of approximately 270° C. The water (0.5% by weight) needed for starting the reaction, as well as urea and hexamethylene diamine, are charged from a side stream of the pressure stage of the VK tube. The caprolactam throughput amounts to 10 k/h. Dwelling time in the pressure stage amounts to 3.4 hours and in the relaxation zone 16 hours. The polymerizate is further processed similary as in Example 1.

The granulate has a content of epsilon-caprolactam of 2.7% by weight. The granulate is melted by means of an extruder (dwelling time 5 minutes) and spun into threads at 260° C., 240° C. and 230° C. The caprolactam contents of the respectively obtained spinning threads, their ruggedness as well as color intensity (K/S value) are determined in similar fashion as in Example 1 and can be learned from Table 1.

EXAMPLE 15

Procedure similar as for Example 14, but the dried granulates are several times sprayed and dried (as uniformly as possible) with a solution of 5 g of urea in 100 ml of methanol. This is repeated as many times as necessary until the urea amount applied to the granulate totals 0.5% by weight. Based on said superficially deposited urea film, it is impossible to provide realistic data with respect to the relative solution viscosity, melt viscosity, melting point and end groups.

The granulate is once more dried down to a water contents of less than 0.1% and farther processed, similarly as in Example 14, by means of a two-screw extruder, where the spinning temperature was varied between 260° C., 240° C. and 230° C. The caprolactam contents of the respectively obtained spinning threads, their ruggedness and color intensity (K/S value) are determined in similar fashion as in Example 1 and can be learned from Table 1.

The measuring results of the preceding examples are summarized in Table 1 below:

TABLE 1

Summary of Measuring Results for Examples 1–15

| Ex. no | $\eta_{rel}$ (H$_2$SO$_4$) | $\eta$ (260° C.) [Pa s] | $T_m$ [° C.] | amino end groups [µval g$^{-1}$] | carboxyl end groups [µval g$^{-1}$] | CL granulate [%] | CL fiber [%] melt spinning temperature 260° C. | 240° C. | 230° C. | tenacity [cN/tex] | K/S (590 nm) |
|---|---|---|---|---|---|---|---|---|---|---|---|
| 1 | 2.32 | 250 | 222.3 | 32.0 | 44.6 | 7.81 | 0.59 | a) | a) | 25.9 | 7.31 |
| 2 | 1.86 | 75 | 221. | 19.2 | 12.8 | 3.60 | b) | 0.13 | 0.11 | 34.7 | 5.64 |
| 3 | 2.22 | 85 | 221.4 | 23.6 | 13.0 | 1.20 | 0.11 | 0.03 | 0.00 | 52.7 | 6.88 |
| 4 | 2.46 | 180 | 222.5 | 14.1 | 6.3 | 2.81 | 0.08 | 0.02 | a) | 39.2 | 7.47 |
| 5 | 2.45 | 175 | 221.4 | 50.3 | 34.3 | 3.65 | 0.08 | 0.05 | 0.01 | 48.4 | 9.96 |
| 6 | 2.62 | 280 | 221.5 | 32.4 | 36.8 | 1.48 | 0.03 | a) | a) | 59.6 | 6.69 |
| 7 | 1.90 | 90 | 223.3 | 26.0 | 30.5 | 4.48 | b) | 0.02 | 0.02 | 48.2 | 3.36 |
| 8 | 2.49 | 210 | 220.6 | 26.4 | 33.1 | 1.34 | 0.03 | 0.01 | a) | 55.6 | 6.49 |
| 9 | 1.79 | 40 | 218.7 | 29.0 | 35.6 | 6.15 | b) | 0.18 | 0.32 | 26.6 | 7.12 |
| 10 | 1.89 | 30 | 219.8 | 32.2 | 140.7 | 2.79 | b) | 0.28 | 0.41 | 35.1 | 7.82 |
| 11 | 1.97 | 40 | 219.4 | 58.0 | 33.8 | 2.70 | b) | 0.30 | 0.27 | 33.4 | 17.64 |
| 12 | 2.43 | 240 | 220.0 | 31.6 | 46.7 | 3.73 | 0.46 | a) | a) | 49.1 | 6.99 |
| 13 | 2.45 | 175 | 222.1 | 23.2 | 15.5 | 2.11 | 0.12 | 0.09 | 0.03 | 44.2 | 6.62 |
| 14 | 2.51 | 255 | 221.9 | 35.0 | 43.2 | — | 0.88 | 0.39 | a) | 35.0 | 7.56 |
| 15 | — | — | — | — | — | — | 0.21 | 0.16 | 0.14 | 37.2 | 7.37 |

Explanatory Remarks with respect to Table 1:
ηrel: relative solution viscosity in 96% sulfuric acid
η: melt viscosity measured at 260° C.
T$_m$: melting point [° C.]
CL: caprolactam contents [%], granulate and/or fiber, not washed
K/S intensity of color for 7.5% coloring with C.I Acid Red 158 at 590 nm
a): based on too high melt viscosity, cannot be spun
b): based on too low melt viscosity, cannot be spun
— no data can be provided.

EXAMPLE 14

1 kg of commercial grade, non-matted standard polyamide 6 granulate is dried down to a water contents of less than 0.1%. For processing the granulate, use is made of the two-shaft screw kneader ZSK 25 WLE of Messrs Krupp Werner & Pleiderer, which is equipped with 2 gas removal housings. The polymer melt is processed directly into fibers via a spinning nozzle connected with the extruder, with the temperature being varied between 260° C. and 240° C. The fibers are removed by a winding device at 100 meters per minute. The caprolactam contents of the respectively obtained spinning threads, their ruggedness and color intensity (K/S value) are determined similarly as in Example 1 and can be learned from Table 1.

The invention claimed is:

1. Method for reducing the contents of epsilon-caprolactam in polyamide 6, obtainable by hydrolytic polymerization of epsilon-caprolactam, wherein an additive forming isocyanic acid under the effect of heat is employed, whereby the additive or the isocyanic acid, obtained externally under thermal effect, is added a) for purposes of polymerization or
   b) to a melt of polyamide 6.

2. Method according to claim 1, wherein by way of an isocyanic acid-forming additive, use is made of urea, biuret, cyanuric acid and/or oligomeric or polymeric homologues of urea.

3. Method according to claim 2, wherein the isocyanic acid is generated externally by thermal decomposition of urea, biuret or cyanuric acid and is added to the polymerization or to the melt of polyamide 6.

4. Method according to claim 1, wherein the additive is added in an amount of approximately 0.01 to 10% by weight, relative to the amount of epsilon-caprolactam or in b) relative to the amount of polyamide 6.

5. Method according to claim 1, wherein customary additives are additionally added.

6. Method according to claim 1, wherein the epsilon-caprolactam content in the polyamide 6 is adjusted to less than approximately 7% by weight.

7. Method according to claim 6, wherein the content of epsilon-caprolactam is reduced by customary extraction methods.

8. Method according to claim 7, wherein the content of epsilon-caprolactam in polyamide 6 is adjusted to less than approximately 0.5% by weight.

9. Method according to claim 1, wherein relative to measure b) the melt is prepared from a polyamide 6, and is present in a mixer into which is dosed-in the additive, wherein an executed extraction measure is included.

10. Method according to claim 9, wherein an extruder is used as mixer.

11. Method according to claim 1, wherein an extracted polyamide 6 is processed, by melt extrusion, into fibers or molding objects.

12. Method according to claim 11, wherein the temperature of the melt is adjusted to approximately 210 to 300° C.

13. Method according to claim 1, wherein with respect to the production of polyamide 6 according to measure a) there takes place, in addition, a treatment according to measure b).

14. Polyamide 6, obtainable according to measure a) of claim 1, having a content of epsilon-caprolactam of less than approximately 7% by weight.

15. Polyamide 6 obtainable according to claim 8, having a content of epsilon-caprolactam of less than approximately 0.5% by weight.

16. Polyamide 6, obtainable according to claim 9, having content of epsilon-caprolactam of less than approximately 0.5% by weight.

17. Method for manufacturing products, comprising melt-extruding the polyamide 6 according to claim 15, with a content of epsilon-caprolactam of less than approximately 0.5% by weight.

18. Fibers, fiber materials or molding articles comprising the polyamide 6 according to claim 15.

19. Method for manufacturing products according to claim 17, wherein said manufacturing products are fibers, fiber products, fiber products or molding articles.

20. Method according to claim 4, wherein the additive is added in an amount of approximately 0.1 to 3% by weight relative to the amount of epsilon-caprolactam or in b) relative to the amount of polyamide 6.

21. Method according to claim 5, wherein said customary additives are at least one selected from the group consisting of oxidation-stabilizers, UV-stabilizers, amines, diamines, triamines and coloring substances.

22. Method according to claim 6, wherein the epsilon-caprolactam content in the polyamide 6 is adjusted to less than 4% by weight.

23. Method according to claim 7, wherein the content of epsilon-caprolactam is reduced by water extraction or by application of low pressure.

24. Method according to claim 8, wherein the content of epsilon-caprolactam in polyamide 6 is adjusted to less than approximately 0.3% by weight.

25. Method according to claim 10, wherein a twin-screw extruder is used as a mixer.

26. Method according to claim 12, wherein the temperature of the melt is adjusted to approximately 230 to 260° C.

27. Polyamide 6 according to claim 14, having a content of epsilon-caprolactam of less than approximately 4% by weight.

28. Polyamide 6 according to claim 15, having a content of epsilon-caprolactam of less than approximately 0.3% by weight.

29. Polyamide 6 according to claim 16, having content of epsilon-caprolactam of less than approximately 0.3% by weight.

30. Method for manufacturing products according to claim 17, wherein said polyamide 6 has a content of epsilon-caprolactam of less than approximately 0.3% by weight.

31. Method for manufacturing products according to claim 17, wherein said melt extruding is performed at a processing temperature of less than approximately 250° C.

32. Fibers, fiber materials or molding articles according to claim 18, wherein said fibers or molding articles are produced by melt extrusion at a processing temperature of less than approximately 250° C.

* * * * *